United States Patent
Perrino

(10) Patent No.: US 11,746,792 B2
(45) Date of Patent: Sep. 5, 2023

(54) TURBOMOLECULAR PUMP LUBRICANT SUPPLY SYSTEMS

(71) Applicant: Edwards Limited, Burgess Hill (GB)

(72) Inventor: Nicola Perrino, Burgess Hill (GB)

(73) Assignee: Edwards Limited, West Sussex (GB)

( * ) Notice: Subject to any disclaimer, the term of this patent is extended or adjusted under 35 U.S.C. 154(b) by 0 days.

(21) Appl. No.: 17/393,820

(22) Filed: Aug. 4, 2021

(65) Prior Publication Data

US 2021/0364000 A1    Nov. 25, 2021

Related U.S. Application Data

(63) Continuation of application No. 16/322,818, filed as application No. PCT/GB2017/052228 on Jul. 31, 2017, now Pat. No. 11,111,927.

(30) Foreign Application Priority Data

Aug. 4, 2016 (GB) ...................... 1613464

(51) Int. Cl.
*F04D 19/04* (2006.01)
*F04D 29/063* (2006.01)
(Continued)

(52) U.S. Cl.
CPC ........... *F04D 19/042* (2013.01); *F04D 19/04* (2013.01); *F04D 29/063* (2013.01);
(Continued)

(58) Field of Classification Search
CPC ...... F04D 19/042; F04D 19/04; F04D 29/059; F04D 29/063; F16C 33/6666;
(Continued)

(56) References Cited

U.S. PATENT DOCUMENTS

| | | |
|---|---|---|
| 2,234,443 A | 3/1941 | MacBeth |
| 3,885,176 A | 5/1975 | Cunningham |

(Continued)

FOREIGN PATENT DOCUMENTS

| | | |
|---|---|---|
| DE | 202013002018 U1 | 3/2013 |
| EP | 1477721 A2 | 11/2004 |

(Continued)

OTHER PUBLICATIONS

British Search Report dated Sep. 29, 2016 and Examination Report dated Sep. 30, 2016 for corresponding British Application No. GB1613464.5.

(Continued)

*Primary Examiner* — Christopher S Bobish
(74) *Attorney, Agent, or Firm* — Theodore M. Magee; Westman, Champlin & Koehler, P.A.

(57) ABSTRACT

A turbomolecular pump has a housing, a rotor shaft supported by a plurality of bearings for rotation relative to the housing about an axis of rotation, a deflector, a lubricant supply system and a lubricant transfer device provided on the rotor shaft. The bearings include a rolling bearing that receives lubricant from the lubricant supply system to via the lubricant transfer device. The rolling bearing is disposed intermediate the lubricant transfer device and the deflector and the deflector is configured to deflect lubricant that passes through the rolling bearing outwardly with respect to the rotor shaft.

18 Claims, 6 Drawing Sheets

(51) Int. Cl.
*F16N 7/12* (2006.01)
*F16N 7/36* (2006.01)
*F16C 33/66* (2006.01)
*F16N 7/18* (2006.01)
*F04D 29/059* (2006.01)

(52) U.S. Cl.
CPC ...... *F16C 33/6666* (2013.01); *F16C 33/6685* (2013.01); *F16N 7/12* (2013.01); *F16N 7/18* (2013.01); *F16N 7/366* (2013.01); *F04D 29/059* (2013.01); *F16C 2360/45* (2013.01)

(58) Field of Classification Search
CPC .... F16C 33/6685; F16C 2360/45; F16N 7/12; F16N 7/18; F16N 7/366
See application file for complete search history.

(56) References Cited

U.S. PATENT DOCUMENTS

| | | | | |
|---|---|---|---|---|
| 5,699,877 | A | 12/1997 | Dreier | |
| 5,996,542 | A | 12/1999 | Bathurst | |
| 8,123,412 | B2* | 2/2012 | Koci | F16C 33/414 |
| | | | | 384/523 |
| 8,186,937 | B2* | 5/2012 | Brewster | F04D 29/0563 |
| | | | | 415/119 |
| 8,202,005 | B2* | 6/2012 | Koch | F04D 29/0563 |
| | | | | 384/465 |
| 8,662,841 | B2* | 3/2014 | Tollner | F04D 29/056 |
| | | | | 415/229 |
| 8,851,829 | B2* | 10/2014 | Brewster | F04D 19/042 |
| | | | | 415/119 |
| 9,046,103 | B2* | 6/2015 | Waye | F16C 33/6648 |
| 9,958,005 | B2* | 5/2018 | Manabe | F16C 33/412 |
| 10,006,492 | B2* | 6/2018 | Manabe | F16C 19/16 |
| 2004/0251084 | A1 | 12/2004 | Blecker et al. | |
| 2008/0112660 | A1* | 5/2008 | Koch | F16C 33/664 |
| | | | | 384/397 |
| 2010/0215475 | A1* | 8/2010 | Brewster | F16C 27/045 |
| | | | | 415/119 |
| 2010/0296917 | A1* | 11/2010 | Waye | F04C 25/02 |
| | | | | 415/111 |
| 2015/0132109 | A1 | 5/2015 | Sumimoto | |
| 2017/0227055 | A1* | 8/2017 | Manabe | F16C 33/6648 |
| 2019/0203727 | A1 | 7/2019 | Perrino | |

FOREIGN PATENT DOCUMENTS

| | | |
|---|---|---|
| EP | 1921322 A2 | 5/2008 |
| EP | 2060795 A2 | 5/2009 |
| EP | 2557315 A2 | 2/2013 |
| EP | 2557316 A2 | 2/2013 |
| EP | 2600005 A1 | 6/2013 |
| EP | 2728195 A2 | 5/2014 |
| EP | 2740956 A2 | 6/2014 |
| EP | 3001039 A2 | 9/2015 |
| GB | 285532 | 2/1928 |
| GB | 885210 | 12/1961 |
| JP | 2011247253 A | 5/2011 |
| JP | 2014173431 A | 9/2014 |

OTHER PUBLICATIONS

PCT Search Report and Written Opinion dated Oct. 25, 2017 for corresponding PCT Application No. PCT/GB2017/052228.
Prosecution history of corresponding U.S. Appl. No. 16/322,818 including: Notice of Allowance dated May 6, 2021, Amendment dated Apr. 23, 2021 and Non-Final Rejection dated Jan. 25, 2021.
Chinese First Office Action dated Mar. 5, 2020 for corresponding Chinese application Serial No. CN201780061904.7, 29 pages.

* cited by examiner

TURBOMOLECULAR PUMP LUBRICANT SUPPLY SYSTEMS

CROSS-REFERENCE OF RELATED APPLICATION

This application is a continuation of and claims priority of U.S. patent application Ser. No. 16/322,818, filed Feb. 1, 2019, which is a Section 371 National Stage Application of International Application No. PCT/GB2017/052228, filed Jul. 31, 2017, and published as WO 2018/025023 A1 on Feb. 8, 2018, the content of which is hereby incorporated by reference in its entirety and which claims priority of British Application No. 1613464.5, filed Aug. 4, 2016.

FIELD

The invention relates to turbomolecular pump lubricant supply systems.

BACKGROUND

Turbomolecular pumps comprise a rotor comprising a plurality of discs mounted on a rotor shaft for rotation relative to a plurality of stator discs disposed in interleaving relationship with the rotor discs. The rotor shaft is supported by a bearing arrangement that may comprise two bearings located at or intermediate respective ends of the shaft. The upper bearing may be in the form of a magnetic bearing and the lower bearing is typically a rolling bearing.

A typical rolling bearing comprises an inner race fixed relative to the rotor shaft, an outer race and a plurality of rolling elements located between the races for allowing relative rotation of the inner race and the outer race. To prevent mutual contact between the rolling elements they are often guided and evenly spaced by a cage. Adequate lubrication is essential to ensure accurate and reliable operation of rolling bearings. The main purpose of the lubricant is to establish a load-carrying film to separate the bearing components in rolling and sliding contact in order to minimise friction and wear. Other purposes include the prevention of oxidation or corrosion of the bearing components, the formation of a barrier to contaminants and the transfer of heat away from the bearing components. The lubricant is generally in the form of either oil or grease (a mixture of oil and a thickening agent).

Turbomolecular pumps using oil-lubricated bearings require an oil feed system to feed oil between the contact areas of the bearing. This enables the oil to perform cooling as well as lubrication and thereby permits the bearings to run at a faster speed. Turbomolecular vacuum pumps have traditionally used a wicking system for supplying oil to a rolling bearing. In such a system, a felt wick supplied by an oil reservoir feeds oil to a conical "oil feed" nut mounted on the shaft. When the shaft rotates, oil travels along the conical surface of the nut to the bearing. The oil then passes through the bearing and is returned to the reservoir under the influence of gravity.

The oil reservoir from which the felt wick is supplied may comprise two stacks comprising layers of felt that lay against respective major surfaces of the felt wick so that the felt wick is sandwiched between the two stacks.

The feed rate of oil to the bearing may be affected by a number of factors, including the taper angle of the conical nut, the rate of transfer of oil from the wick to the nut, the surface finish of the conical surface of the nut, temperature and the speed of rotation of the shaft.

The discussion above is merely provided for general background information and is not intended to be used as an aid in determining the scope of the claimed subject matter. The claimed subject matter is not limited to implementations that solve any or all disadvantages noted in the background.

SUMMARY

The invention provides a lubricant supply system comprising:
a lubricant reservoir body;
a finger projecting inwardly from said lubricant reservoir body;
a plurality of lubricant return members; and
a holder having a main holder body to hold said lubricant reservoir body and a plurality of return member holder bodies extending from said main holder body to hold respective lubricant return members, each lubricant return member extending through an aperture provided in said main holder body.

The invention provides a turbomolecular pump comprising:
a housing;
a pumping mechanism disposed in said housing, said pumping mechanism comprising a rotor shaft having an axis of rotation;
a plurality of bearings supporting said rotor shaft for rotation relative to said housing about said axis of rotation, said plurality of bearings including a rolling bearing;
a deflector;
a lubricant supply system;
a lubricant transfer device provided on said rotor shaft to transfer lubricant from said lubricant supply system to said rolling bearing; and
a collection channel,
wherein said rolling bearing is disposed intermediate said lubricant transfer device and said deflector and said deflector is configured to deflect lubricant that passes through said rolling bearing outwardly with respect to said rotor shaft, said deflector being configured to deflect said lubricant into said collection channel,
wherein said lubricant supply system comprises a lubricant reservoir body, a finger projecting inwardly from said reservoir body to engage said lubricant transfer device and a lubricant return member extending from said lubricant reservoir body to said collection channel to transfer lubricant from said collection channel to said lubricant reservoir body, and
wherein said turbomolecular pump further comprises a holder having a main holder body to hold said lubricant reservoir body and a return member holder body extending from said main holder body to hold said lubricant return member, said lubricant return member extending through an aperture provided in said main holder body, wherein said housing is provided with a recess, said holder being received in said recess.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE DRAWINGS

In the following disclosure, reference will be made to the drawings, in which.

DETAILED DESCRIPTION

Figure 1:
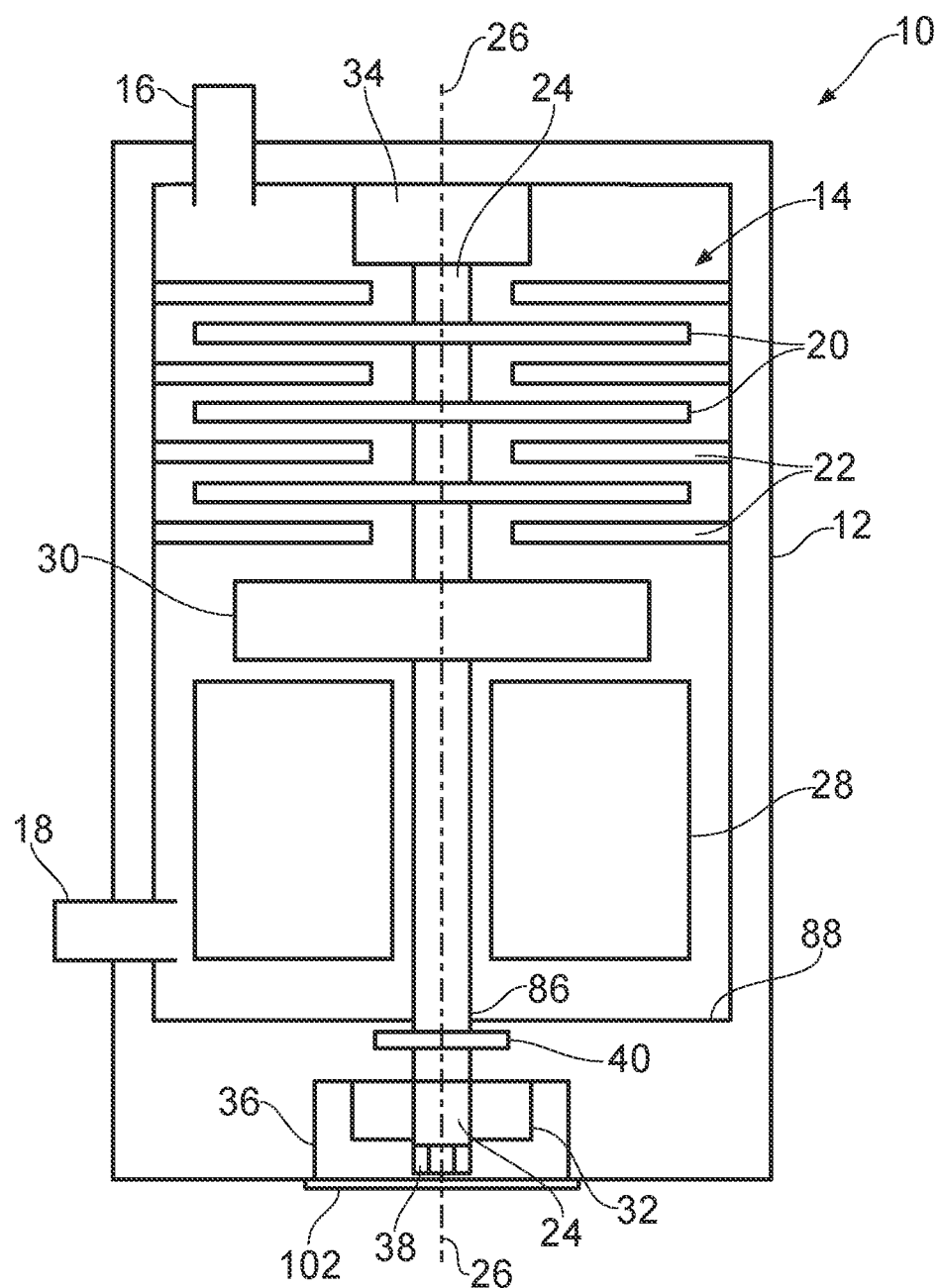
FIG. 1 is a schematic representation of an example of a turbomolecular vacuum pump.

Referring to FIG. 1, a turbomolecular pump 10 comprises a housing 12, a pumping mechanism 14 disposed in the housing, an inlet 16 and an outlet 18. The pumping mechanism 14 comprises a turbomolecular pumping mechanism comprising a plurality of rotor blades 20 disposed in interleaving relationship with a plurality of stator discs 22. The rotor blades 20 are mounted on, or integral with, a rotor shaft 24 that has a longitudinal axis (axis of rotation) 26. The rotor shaft 24 is driven to rotate about the axis of rotation 26 by a motor 28. The pumping mechanism 14 may additionally comprise a molecular drag pumping mechanism 30, which may be a Gaede mechanism, a Holweck mechanism or a Siegbahn mechanism. There may be additional, or alternative, mechanisms downstream of the molecular drag pumping mechanism such as an aerodynamic pumping mechanism comprising a regenerative mechanism.

The rotor shaft 24 is supported by a plurality of bearings 32, 34. The plurality of bearings may comprise two bearings 32, 34 positioned at, or adjacent, respective ends of the rotor shaft 24 as shown, or alternatively, intermediate the ends. In the example illustrated by FIG. 1, a rolling bearing 32 supports a first end portion of the rotor shaft 24 and a magnetic bearing 34 supports a second end portion of the rotor shaft 24. A second rolling bearing may be used as an alternative to the magnetic bearing 34. When a magnetic bearing 34 is used, a back-up rolling bearing (not shown) may optionally be provided.

The turbomolecular pump 10 additionally comprises a lubricant supply system 36 and a lubricant transfer device 38 provided on the rotor shaft 24 to transfer lubricant from the lubricant supply system to the rolling bearing 32. The lubricant supply system 36 may comprise a deflector 40 mounted on the rotor shaft 24.

Figure 2:
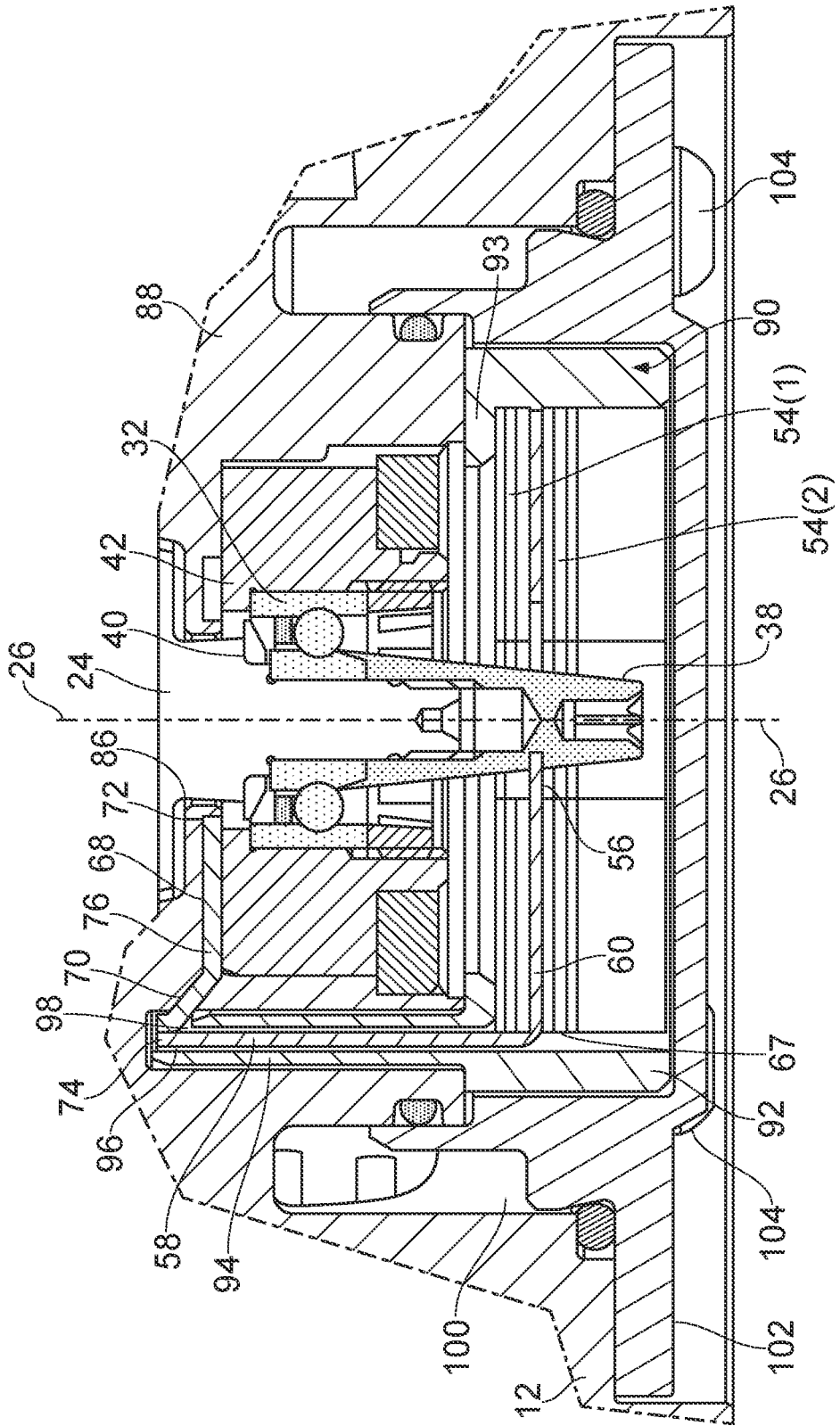
FIG. 2 is a section through a bearing and lubricant supply system of the turbomolecular vacuum pump of FIG. 1.
Figure 3:
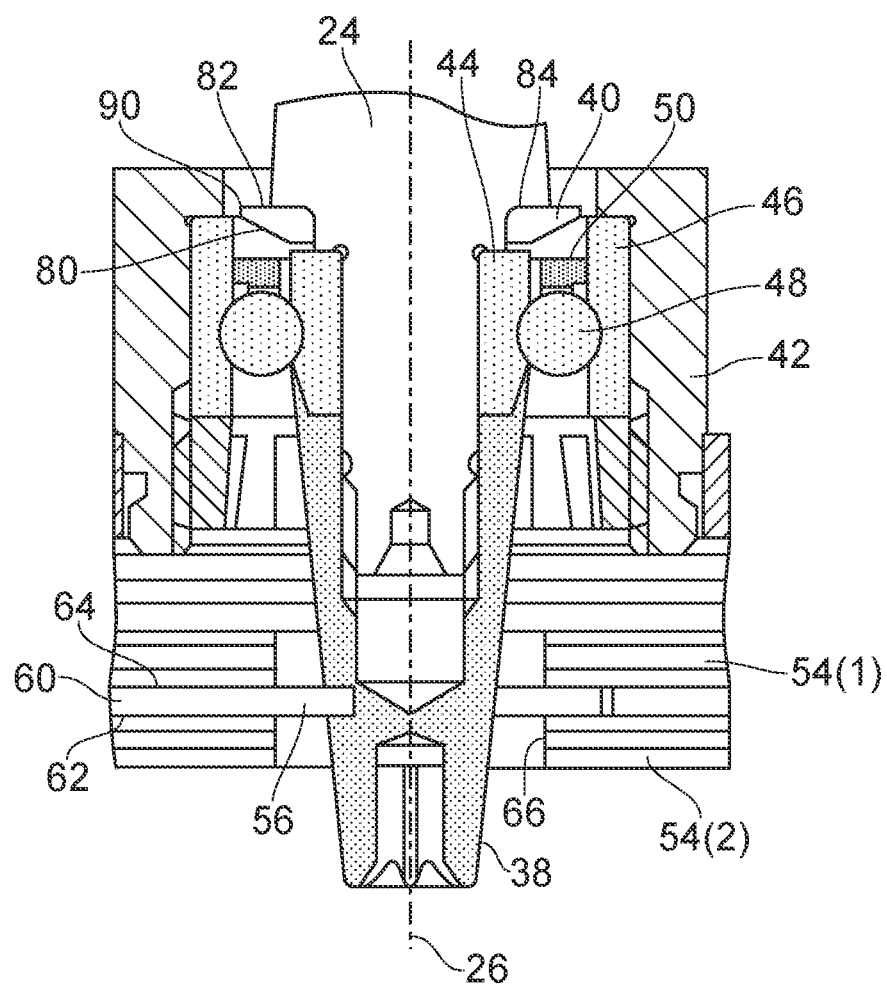
FIG. 3 is an enlargement of a portion of FIG. 2.

Referring to FIGS. 2 and 3, the rolling bearing 32 is provided between the first end portion of the rotor shaft 24 and a bearing housing 42 of the vacuum pump 10. The bearing housing 42 may be integral with the housing 12 or a component fitted to the housing as shown in FIG. 2. The rolling bearing 32 comprises an inner race 44 fixed relative to the rotor shaft 24, an outer race 46 fixed relative to the bearing housing 42, a plurality of rolling elements 48 disposed between the inner and outer races and a cage 50 that is configured to provide a desired spacing between the rolling elements. The rolling bearing 32 is configured to allow relative rotation of the inner and outer races 44, 46 so that it can support the rotor shaft 24 during rotation of the rotor shaft relative to the housing 12. The rolling bearing 32 is supplied with a lubricant from the lubricant supply system 36 to establish a load-carrying film that separates the rolling elements 48 from the inner and outer races 44, 46 to minimise friction and wear. The lubricant is liquid and may be an oil.

The lubricant supply system 36 comprises a lubricant reservoir body 54(1), 54(2), a finger 56 projecting inwardly of the lubricant reservoir body to engage the lubricant transfer device 38 to transfer lubricant from the lubricant reservoir body to the lubricant transfer device and a lubricant return member 58. In the illustrated example, the finger 56 is connected with the lubricant return member 58 by an integral body member 60 that is engaged by the lubricant reservoir body 54(1), 54(2). It may be advantageous to form the finger 56, lubricant return member 58 and body member 60 as one piece to both facilitate assembly and avoid having interfaces between the elements that might impair lubricant flow. The finger 56 and lubricant return member 58 may be disposed in line. Having the finger 56 and lubricant return member 58 aligned may improve lubricant delivery from the lubricant return member to the finger.

Figure 4:
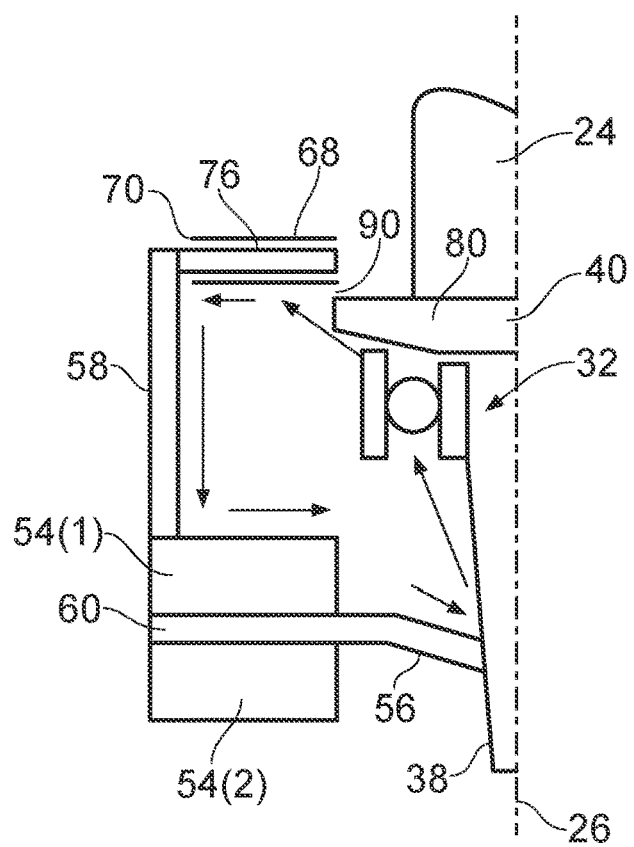
FIG. 4 is a schematic illustration of a lubricant circulation path in the lubricant supply system of FIG. 2.

The body member 60 may be a generally planar member having a first major face 62 and a second major face 64 disposed opposite the first major face and the lubricant reservoir body may comprise respective separate body portions 54(1), 54(2) respectively engaging the first and second major faces 62, 64 of the body member 60. The body member 60 may be a generally annular member and the finger 56 may project generally radially inwardly from the inner periphery 66 of the annular body member to engage the lubricant transfer device 38. Prior to fitting to the turbomolecular pump 10, the finger 56 may extend generally in the plane of the body member 60. To ensure engagement with the lubricant transfer device 38, the finger 56 may be sized so that it deflects when engaging the lubricant transfer device. The finger 56 may, for example, be sized and arranged such that it deflects out of the plane of the body member 60 as shown in FIG. 4.

The lubricant return member 58 may have a rectangular cross section and may extend from the outer periphery 67 of the body member 60. As with the finger 56, prior to fitting the lubricant return member 58 may extend in the plane of the body member 60. This facilitates production of the finger 56, lubricant return member 58 and integral body member 60 by a blanking/stamping process. In use, the lubricant return member 58 may be bent out of the plane of the body member 60. Although not essential, in some examples the lubricant return member 58 may be bent such that it extends generally perpendicular to the body member 60 and may extend generally parallel of the axis of rotation 26 of the rotor shaft 24.

Figure 8:
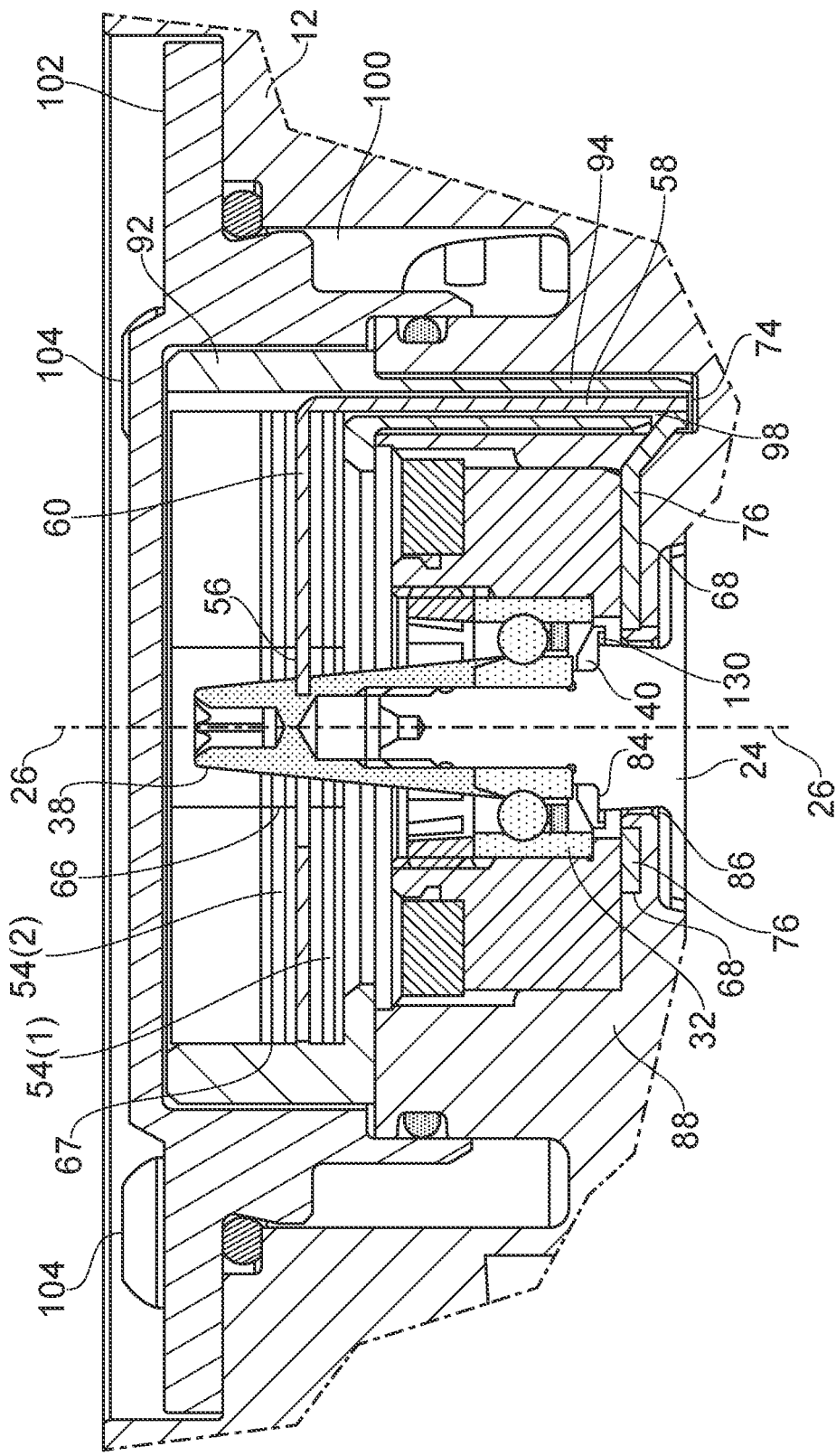
FIG. 8 is a view corresponding to FIG. 2 with the turbomolecular pump in an inverted condition.

The lubricant reservoir body 54(1), 54(2), finger 56, lubricant return member 58 and body member 60 may be made of a stable fibrous material or materials that are able to conduct lubricant by a capillary or wicking action. The fibrous material may be natural or synthetic and in some examples may be a felt material. The lubricant reservoir body 54(1), 54(2), finger 56, lubricant return member 58 and body member 60 may be made of the same fibrous material, although in some examples different fibrous materials may be used. Although not essential, one or both body portions 54(1), 54(2) of the lubricant reservoir body may comprise a plurality of relatively thin layers of fibrous material stacked one upon another as shown in FIGS. 2, 3 and 8.

The lubricant supply system 36 may further comprise a collection channel 68 that is configured to receive lubricant that has been supplied to the rolling bearing 32 via the lubricant transfer device 38 and then passed through the bearing. The collection channel 68 has a downstream end 70 and an upstream end 72 that is disposed relatively closer to the rotor shaft 24 to receive lubricant that has passed through the rolling bearing 32. The collection channel 68 may extend radially outwardly with respect to the rotor shaft 24 to channel the collected lubricant away from the rotor shaft. The upstream end 74 of the lubricant return member 58 may be disposed at or adjacent the downstream end 70 of the collection channel 68 to receive and return lubricant from the collection channel 68 to the lubricant reservoir body 54(1), 54(2). Although not essential, in some examples, an absorbent collector body 76 may be disposed in the collection channel 68. The collector body 76 may be made of a fibrous material that transfers lubricant from the upstream end 72 of the collection channel 68 to the downstream end 70 by a capillary or wicking action. The collector body 76 may be made of the same fibrous material as one or more of the lubricant reservoir body 54(1), 54(2), finger 56, lubricant return member 58 and body member 60. The collector body 76 may have an end portion that projects outwardly from the downstream end 70 of the collection channel 66 to ensure engagement with the upstream end 74 of the lubricant return member 58.

The lubricant transfer device 38 may be a conical sleeve secured to the rotor shaft 24. The lubricant transfer device 38 has an outer surface that tapers radially outwardly as it approaches the rolling bearing 32. The rotor shaft 24 and lubricant transfer device 38 may be provided with male and female threads respectively to enable the lubricant transfer device to be screwed onto the rotor shaft in the manner of a nut. Alternatively, the lubricant transfer device 38 may simply slide onto the rotor shaft 24 and be secured to the rotor shaft by means of a nut, bolt, screw or other suitable securing means.

The deflector 40 is mounted on the rotor shaft 24 such that the rolling bearing 32 is disposed between the deflector and the lubricant transfer device 38. The positioning of the deflector 40 is such that lubricant transferred from the lubricant transfer device 38 to the rolling bearing 32 that passes through the rolling bearing may impinge on the deflector. The deflector 40 is configured to deflect lubricant that passes through the rolling bearing 32 into the collection channel 68.

Still referring to FIGS. 2 and 3, the deflector 40 may be an annular body that has a first major surface 80 that faces the rolling bearing 32 and an oppositely directed major surface 82 that abuts a shoulder 84 defined by a reduced diameter section of the rotor shaft 24. The shoulder 84 is disposed adjacent a bore 86 provided in a partition 88 that separates the pumping mechanism 14 from the rolling bearing 82. The partition 88 may be an integral part of the housing 12 or an element fitted into and secured to the housing 12. The bore 86 is defined by a bore wall that with respect to the axis of rotation 26 is disposed radially inwardly of at least a portion of the deflector that extends circumferentially about said axis of rotation. Thus, the deflector 40 is configured such that its outer periphery 90 is disposed radially outwardly of the bore 86 so that the bore is covered by the deflector. Referring to FIG. 2, it can be seen that the wall of the bore 86 is disposed a first radial distance from axis of rotation 26, the outer periphery 90 of the deflector 40 is disposed a second radial distance from the axis of rotation that is greater than the first radial distance, the upstream end 72 of the collection channel 68 is disposed a third radial distance from the axis of rotation and the second radial distance being equal to or greater than the third radial distance. Thus, the deflector 40 is configured to shield the bore 86 against the ingress of lubricant that has passed through the rolling bearing 32 and deflect, or divert, the lubricant into the collection channel 68.

The first major surface 80 may comprise a surface that is inclined with respect to the axis of rotation 26 of the rotor shaft 24. The incline may be such that the inclined surface tapers radially outwardly as it approaches the bore 86 and the wall 88. The inclined surface may comprise the entirety of the first major surface 82 or just form an inclined annular band portion of the first major surface.

Referring to FIG. 2, the lubricant supply system 36 may comprise a holder 90 to hold the lubricant reservoir body 54(1), 54(2), lubricant member 58 and body member 60. The holder 90 may comprise a main holder body 92 that is open at each end and is configured to receive the reservoir body 54(1), 54(2) and body member 60. The inner end of the main holder body 92 may comprise a transversely extending annular lip 93 that is connected with a return member holder body 94. The return member holder body 94 may be integral with the main holder body 92, secured to the main holder body or disposed in the turbomolecular vacuum pump 10 such that it abuts the inner end of the main holder body. The return member holder body 94 may be an elongate body defining a lengthways extending channel 96 configured to receive the lubricant return member 58. The return member holder body 94 may be disposed adjacent the outer periphery of the main holder body 92. The inner end of the main holder body 92 may be provided with an aperture configured to allow the lubricant return member 58 to extend from the main holder body through the lip 93 and into the channel 96. One or both of the return member holder 94 and the channel 96 may extend at least substantially parallel to the axis of rotation 26. The channel 96 may be sized such that it is a sliding fit for the lubricant return member 58 to enable it to hold and support the lubricant return member. Providing a relatively close fit between lubricant return member 58 and the walls defining the channel 96 may facilitate the transfer of lubricant along the lubricant member through capillary action between the walls and the lubricant return member. The end of the return member holder body 94 disposed remote from the main holder body 92 and adjacent the downstream end 70 of the collection channel 68 may be provided with a recess, or notch, 98 configured to allow the collector body 76 to project into the channel 96 to facilitate engagement between the lubricant return member 58 and the collector body. Although not essential, the holder 90 may comprise one or more plastics mouldings.

Referring to FIG. 2, the holder 90 may be received in a recess 100 provided at an end of the housing 12. The inner end of the recess 100 may be at least in part defined by the wall 88. The rolling bearing 32 is housed in the recess 100. The holder 90 may be held in place in the recess 100 by an end cap 102 that may be secured to the housing 12 by bolts 104, clamps, screws or any other suitable securing mechanism. By suitable sizing of the holder 90 so that it is a close fit with the lubricant return member 58 and the outer periphery 67 of the lubricant reservoir body 54(1), 54(2), the lubricant reservoir body 54(1), 54(2), finger 56 and lubricant member 58 can be quickly and accurately installed in the housing 12 by first fitting the parts in the holder and then inserting the holder into the housing.

Referring to FIG. 4, when the rotor shaft 24 rotates about the axis of rotation 26, lubricant transferred to the lubricant transfer device 38 via the finger 56 is moved along the tapered outer surface of the lubricant transfer device and into the rolling bearing 32. Lubricant that passes through the rolling bearing 32 impinges on the first major surface 80 of the deflector 40, which deflects, or flings, the lubricant towards the collection channel 68 where it is absorbed by the collector body 76. The lubricant collected in the collector body 76 migrates to the downstream end 70 of the collection channel 68 by a capillary or wicking action and passes into the lubricant return member 58 via which it is returned to the lubricant reservoir body 54(1), 54(2). Thus, lubricant supplied to the rolling bearing 32 can be effectively returned to the lubricant reservoir body 54(1), 54(2) for recirculation.

The collection channel 68 may be an annular channel, or passage that surrounds the rotor shaft such that the upstream end 72 of the collection channel is defined by the inner circumference of the annular channel and the downstream end 70 is defined by the outer circumference of the annular collection channel. In some examples, an annular collector body 76 may be fitted in the collection channel 68, in which case the upstream end of the lubricant return member 58 may abut the collector body at or adjacent the outer periphery of the collector body. In some examples the absorbent collector body 76 may be omitted, in which case the upstream end 74 of the lubricant return member 58 may be disposed in the collection channel 68 such that, in use, it is in direct contact with lubricant pooling in the collection channel. As described in more detail below with reference to FIG. 6, in some examples the collection channel 68 may comprise an annular portion with a channel extending radially outwardly to the lubricant return member 58 and there may be an absorbent collector body 76 disposed in the collection channel that comprises an annular body portion and a radially extending tab.

Figure 5:
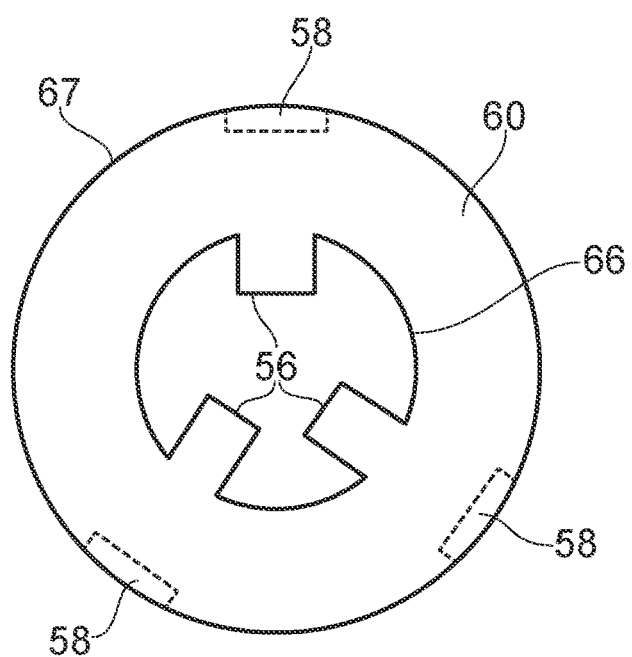
FIG. 5 is a plan view illustrating a modification to the lubricant supply system.

In FIGS. 1 and 2, the lubricant supply system 36 is shown comprising one finger 56 and one lubricant return member 58. However, in some examples, there may be a plurality of fingers 56 or lubricant return members 58. For example, as shown in FIG. 5 there may be three fingers 56 disposed in equi-spaced relation about the inner periphery 66 of the body member 60 and three lubricant return members 58 disposed in equi-spaced relation about the outer periphery 67 of the body member. Although not essential, the arrangement of the fingers 56 and lubricant return members 58 may be such that each finger is aligned with a respective lubricant return member. In examples in which a holder such as the holder 90 is used, the holder may be provided with respective return member holder bodies 94 for the return members 58. A holder such as the holder 90 may prove particularly useful if there are multiple lubricant return members 58 as it provides the possibility of locating the lubricant return members 58 within the return member holder bodies 94 outside of the housing 12 and then simply plugging the assembly into the housing, rather than having to individually manipulate the lubricant return members into position within the housing.

Figure 6:
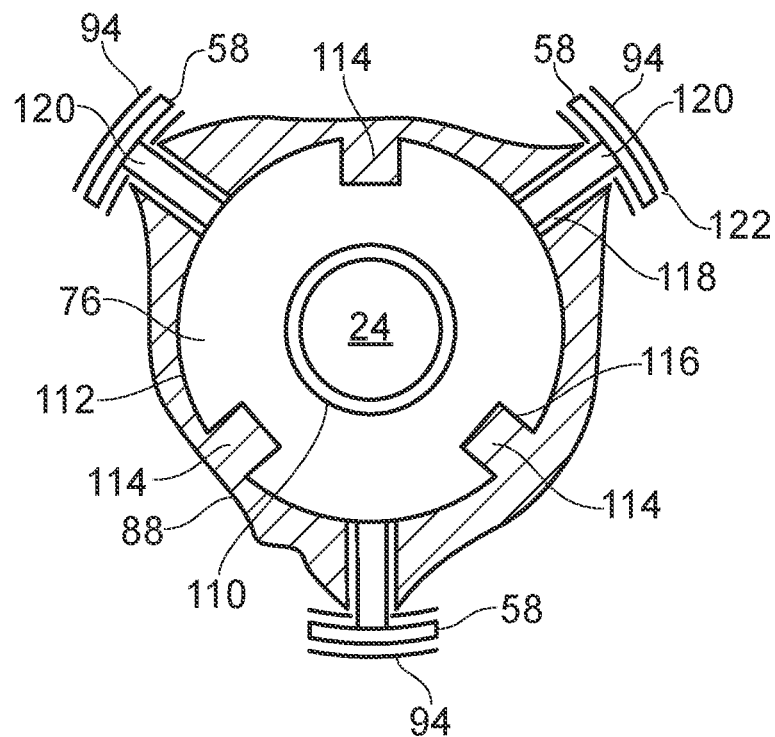
FIG. 6 is a plan view showing another modification to the lubricant supply system.

FIG. 6 shows a collector body 76 that may be used in a lubricant supply system 36 that includes three lubricant return members as shown by way of example in FIG. 5. The collector body 76 has an annular body portion configured to be received in an annular portion of a collection channel defined by the wall 88. At least one of the side walls 110, 112 of the collection channel may be provided with projections 114 that extend into the collection channel and the collector body 76 may be provided with mating recesses, or notches 116 that receive the projections. The collection channel includes radially outwardly extending channels 118 that extend to the return member holder bodies 94 to receive respective tabs 120 that project from the outer periphery of the annular body portion of the collector body 76. The tabs 120 provide a continuous lubricant conducting fibre path between the collector body 76 and the lubricant return members 58.

The channels 96 defined by the return member holder bodies 94 may be open only at opposite ends such that they completely enclose the lubricant return members 58 along the length of the lubricant return members. However, as shown in FIG. 6, the return member holder bodies 94 may have at least one lengthways extending slot 122 that provides access to the lubricant return member 58 over at least a part of the length of the return member holder body 94 intermediate its ends. The slots 122 may assist in threading the lubricant return members 58 along the return member holder bodies 94 during assembly.

Figure 7:
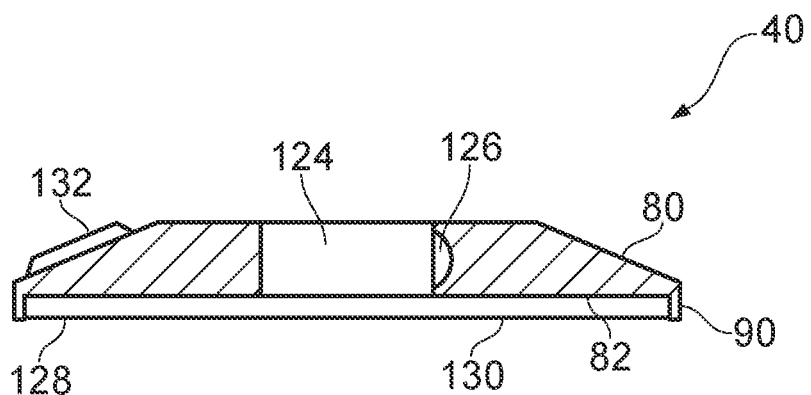
FIG. 7 is a section view through an example of an alternative deflector for the lubricant supply system.

FIG. 7 shows another example of a deflector 40. The deflector 40 has a bore 124 sized to allow the deflector to be slid onto the rotor shaft 24 to bring the second major surface 82 into abutment with the shoulder 84. The deflector 40 may be made from a resilient material and provided with one or more cut-outs 126 adjacent the bore 124 to provide increased flexure about the bore. This may allow fitting of a deflector 40 with a bore sized to be a slight interference fit with the rotor shaft 24 to provide retention of the deflector without the use of a nut or other form of securing means. The cut-out 126 may take the form of a recess or hollow within the deflector as shown in FIG. 7. In other examples, there may be cut-outs 126 may take the form of serrations that may extend in the axial direction of the bore 124 or apertures disposed radially outwardly of, but adjacent, the bore 124. For example, the cut-outs may comprise a series of through-holes disposed about the bore 124. The deflector 40 may be made of a plastics material, for example as a plastics moulding.

Optionally, the deflector 40 may comprise a drip former 130 configured to prevent lubricant flowing from the first major surface 80 over the second major surface 82 to the rotor shaft 24. In the illustrated example the drip former 130 comprises a circumferentially extending skirt. The skirt may be disposed at the outer periphery 90 of the deflector 140. In the radial direction of the deflector 40, the skirt is preferably relatively thin so as to provide a relatively small surface area that is not at least inclined steeply with respect to the rotor shaft 24. Although the skirt is shown disposed at the outer periphery 90 of the deflector 40, this is not essential and in some examples the skirt may be disposed on the second major surface 82 at a position radially inwards of the outer periphery provided it is arranged such that any lubricant dripping from the skirt will fall away from the rotor shaft 24 and, preferably, directly into the collection channel.

In the illustrated example the drip former 130 is shown as a skirt. In other examples the drip former may comprise a circumferentially extending groove or other formation(s) that break(s) up the second major surface 82 to cause lubricant flowing onto the second major surface 82 to form drips so that lubricant is at least substantially prevented from flowing over the second major surface to the rotor shaft 24.

The first major surface 80 of the deflector may be provided with formations 132 configured to cause lubricant impinging on the first major surface to be flung radially outwardly of the deflector 40 to be collected in the collection channel 68. The formations 132 may comprise fins projecting from the first major surface 130.

FIG. 8 is a view corresponding to FIG. 2 showing the turbomolecular vacuum pump 10 used in an inverted condition and fitted with the deflector 40 shown in FIG. 7. The provision of lubrication return members 58 allows the turbomolecular vacuum pump 10 to be used in any orientation, including the inverted position shown in FIG. 8 and the complete range of inclined positions between the positions shown in FIGS. 2 and 8. Even in inclined positions and the inverted position shown in FIG. 8, a liquid lubricant can be supplied to the rolling bearing 32 and returned to the lubricant reservoir body 54(1), 54(2) for resupply to the rolling bearing. Thus a lubricant recirculation circuit is provided.

The deflector 40 may function to prevent the migration of lubricant along the rotor shaft 24 into the pumping mechanism 14. Migration of lubricant into the pumping mechanism is something that may be a particular problem when the turbomolecular pump 10 is used in an inverted or inclined position and is stationary. This is because lubricant present in the rolling bearing 32 and on the lubricant transfer device 38 when the pump is stopped will tend to drain along the rotor shaft 24 into the pumping mechanism. In the illustrated examples, and particularly the example illustrated in FIG. 8, the deflector 40 will deflect any such lubricant into the collection channel 68.

In the illustrated examples the deflector is mounted on the rotor shaft. In some examples, the deflector may be provided on rolling bearing, for example on the inner race.

The illustrated turbomolecular vacuum pumps have a rotor carrying shaft simply supported between two bearings (either mechanical or magnetic). Other turbomolecular pumps may have rotor shaft supported by bearings such that the rotor is cantilever supported. The bearings may be rolling bearings or a combination of rolling bearings and magnetic bearings as previously described. It is to be understood that the above described lubrication supply systems and deflectors may be applied to such turbomolecular pumps.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

What is claimed is:

1. A lubricant supply system comprising:
a lubricant reservoir body;
a finger projecting inwardly from said lubricant reservoir body;
a plurality of lubricant return members;
a holder having a main holder body to hold said lubricant reservoir body and a plurality of return member holder bodies extending from said main holder body to hold respective lubricant return members, each lubricant return member extending through an aperture provided in said main holder body;
a collection channel, said lubricant return members extending from said lubricant reservoir body to said collection channel to transfer lubricant from said collection channel to said lubricant reservoir body; and
a collector body having an annular portion and a tab portion extending from the annular portion into the collection channel.

2. The lubricant supply system as claimed in claim 1, wherein each return member holder body is an elongate body defining a channel configured to receive the respective lubricant return member.

3. The lubricant supply system as claimed in claim 2, wherein the channels defined by the return member holder bodies are open only at opposite ends of the respective return member holder body, such that each return member holder body completely encloses the respective lubricant return member along the length of the lubricant return member.

4. The lubricant supply system as claimed in claim 2, wherein the return member holder bodies each have at least one slot that provides access to the respective lubricant return member over at least a part of the length of the return member holder body intermediate its ends.

5. A turbomolecular pump comprising:
a housing;
a pumping mechanism disposed in said housing, said pumping mechanism comprising a rotor shaft having an axis of rotation;
a plurality of bearings supporting said rotor shaft for rotation relative to said housing about said axis of rotation, said plurality of bearings including a rolling bearing;
a bearing housing wherein an outer race of the rolling bearing is fixed relative to the bearing housing;
a deflector;
a lubricant supply system;
a lubricant transfer device provided on said rotor shaft to transfer lubricant from said lubricant supply system to said rolling bearing; and
a collection channel,
wherein said rolling bearing is disposed intermediate said lubricant transfer device and said deflector and said deflector is configured to deflect lubricant that passes through said rolling bearing outwardly with respect to said rotor shaft, said deflector being configured to deflect said lubricant into said collection channel,
wherein said lubricant supply system comprises a lubricant reservoir body, a finger projecting inwardly from said reservoir body to engage said lubricant transfer device and a lubricant return member extending from said lubricant reservoir body to said collection channel to transfer lubricant from said collection channel to said lubricant reservoir body, and
wherein said turbomolecular pump further comprises a holder having a main holder body to hold said lubricant reservoir body and a return member holder body extending from said main holder body to hold said lubricant return member, said lubricant return member extending through an aperture provided in said main holder body, wherein said housing is provided with a recess, said holder being received in said recess such that when the bearing housing is present in said housing, the holder is configured to be inserted into said housing.

6. The turbomolecular pump as claimed in claim 5, wherein said holder is held in place in said recess by an end cap that is secured to said housing.

7. The turbomolecular pump as claimed in claim 5, wherein said holder is configured such that said lubricant reservoir body, said finger and said lubricant return member are locatable in the holder and the holder is insertable into the housing.

8. The turbomolecular pump as claimed in claim 5, wherein said deflector comprises an upstream major surface that faces said rolling bearing, said upstream major surface comprising a surface that is inclined with respect to said axis of rotation.

9. The turbomolecular pump as claimed in claim 5, wherein said deflector comprises a downstream major surface that faces away from said rolling bearing and a drip former that is configured to cause lubricant flowing over said downstream major surface to form into droplets that drip from said deflector to prevent lubricant flowing over said downstream major surface to said rotor shaft.

10. The turbomolecular pump as claimed in claim 9, wherein said drip former comprises a circumferentially extending skirt disposed on said downstream major surface.

11. The turbomolecular pump as claimed in claim 5, wherein said deflector is made of a polymer.

12. The turbomolecular pump as claimed in claim 5, wherein said deflector is mounted on said rotor shaft.

13. The turbomolecular pump as claimed in claim 12, wherein said deflector has a bore that receives a mating portion of said rotor shaft and is provided with at least one cut out to provide flexure adjacent said bore.

14. The turbomolecular pump as claimed in claim 5, wherein said collection channel has an upstream end disposed a first radial distance from said axis of rotation, said deflector has an outer periphery disposed a second radial distance from said axis of rotation and said second radial distance is at least equal to said first radial distance.

15. The turbomolecular pump as claimed in claim 5, wherein said lubricant supply system further comprises an absorbent collector body disposed in said collection channel and in engagement with said lubricant return member.

16. The turbomolecular pump as claimed in claim 5, wherein said finger and said lubricant return member are connected by an integral body member.

17. The turbomolecular pump as claimed in claim 16, wherein said body member is a planar body having a first major face and a second major face and said reservoir body engages at least one said major face.

18. The turbomolecular pump as claimed in claim 5, wherein said rotor shaft extends through a bore provided in a partition disposed in said housing, and said bore is disposed between said deflector and said pumping mechanism and is defined by a bore wall that with respect to said axis of rotation is disposed radially inwardly of at least a portion of said deflector that extends circumferentially about said axis of rotation.

* * * * *